US012582087B2

(12) United States Patent
Reisberg et al.

(10) Patent No.: US 12,582,087 B2
(45) Date of Patent: Mar. 24, 2026

(54) BACKPACK FOR CARRYING ANIMALS

(71) Applicant: LITTLE CHONK COMPANY,
Brooklyn, NY (US)

(72) Inventors: Bryan Reisberg, Brooklyn, NY (US);
Scott Dunn, Brooklyn, NY (US); **Brian
Lee,** Merrick, NY (US)

(73) Assignee: LITTLE CHONK COMPANY,
Brooklyn, NY (US)

( * ) Notice: Subject to any disclaimer, the term of this
patent is extended or adjusted under 35
U.S.C. 154(b) by 0 days.

(21) Appl. No.: 18/653,551

(22) Filed: May 2, 2024

(65) Prior Publication Data

US 2024/0349691 A1 Oct. 24, 2024

Related U.S. Application Data

(63) Continuation of application No.
PCT/US2022/047457, filed on Oct. 21, 2022.

(60) Provisional application No. 63/275,526, filed on Nov.
4, 2021.

(51) Int. Cl.
*A01K 1/02* (2006.01)
*A45F 3/00* (2006.01)
*A45F 3/04* (2006.01)

(52) U.S. Cl.
CPC .............. *A01K 1/029* (2013.01); *A45F 3/04*
(2013.01); *A45F 2003/003* (2013.01); *A45F
2003/045* (2013.01)

(58) Field of Classification Search
CPC ...................................................... A01K 1/029
See application file for complete search history.

(56) References Cited

U.S. PATENT DOCUMENTS

| 3,197,100 A | 7/1965 | Thompson |
| 3,481,517 A | 12/1969 | Aukerman |
| 3,700,905 A | 10/1972 | Parkin et al. |

(Continued)

FOREIGN PATENT DOCUMENTS

| AT | 241094 A | 1/1997 |
| BR | MU8801660-9 U2 | 7/2009 |

(Continued)

OTHER PUBLICATIONS

Pet Haversack (Year: 2014).*

(Continued)

*Primary Examiner* — Christopher D Hutchens
*Assistant Examiner* — Nevena Aleksic
(74) *Attorney, Agent, or Firm* — Ruggiero McAllister &
McMahon LLC

(57) ABSTRACT

A backpack for carrying pets includes a main body that has
a compartment for carrying a pet, shoulder straps attached to
the front of the main body, a brace attached to the back of
the main body, and a yoke attached to the brace so that a
singular hole is formed between the yoke and a top portion
of the main body that defines a paw portal allowing the limbs
of the pet to protrude from the backpack. A tail port can be
included at a bottom of the main body to allow the tail of the
pet to protrude from the main body. The main body and
brace provide rigidity and adjustable compression to allow
the pet to sit up in the main body when carried in the
backpack. The main body has multiple entry and exit points
for loading and unloading the pet.

22 Claims, 15 Drawing Sheets

(56) References Cited

U.S. PATENT DOCUMENTS

| | | | |
|---|---|---|---|
| 4,194,656 A | 3/1980 | Zufich | |
| 4,434,920 A | 3/1984 | Moore | |
| 4,884,731 A | 12/1989 | Sibley | |
| 4,979,658 A | 12/1990 | Baker | |
| 5,114,059 A | 5/1992 | Thatcher | |
| 5,176,102 A | 1/1993 | Tracy | |
| 5,419,281 A | 5/1995 | Williams et al. | |
| D375,622 S | 11/1996 | Croft | |
| 5,662,339 A | 9/1997 | Svendsen et al. | |
| 5,738,043 A | 4/1998 | Manuel | |
| 5,791,535 A | 8/1998 | Roan et al. | |
| 5,931,120 A | 8/1999 | Burns et al. | |
| D418,972 S | 1/2000 | Gold | |
| 6,202,910 B1 | 3/2001 | Swetish | |
| D460,614 S | 7/2002 | Reimers et al. | |
| 6,481,606 B2 | 11/2002 | Pickett | |
| D664,765 S | 8/2012 | Saia | |
| D699,941 S | 2/2014 | Robert | |
| 9,044,080 B2 | 6/2015 | Ashenafi | |
| 9,295,234 B2 | 3/2016 | Shewfelt | |
| D778,051 S | 2/2017 | Johnson | |
| D778,595 S | 2/2017 | Zurowski | |
| 9,756,920 B2 | 9/2017 | Spears | |
| 9,781,901 B2 | 10/2017 | Rivera | |
| 9,877,558 B1 | 1/2018 | Harstvedt | |
| D818,262 S | 5/2018 | Schofield | |
| D822,378 S | 7/2018 | Franek | |
| 10,321,661 B2 | 6/2019 | Kath | |
| 10,512,245 B2 | 12/2019 | Hazouri-Yeary | |
| D876,826 S | 3/2020 | Watson et al. | |
| D878,036 S | 3/2020 | Watson et al. | |
| 10,617,096 B2 | 4/2020 | Watson et al. | |
| D908,975 S | 1/2021 | Watson et al. | |
| D909,049 S | 2/2021 | Watson | |
| D910,243 S | 2/2021 | Watson | |
| D970,881 S | 11/2022 | Watson | |
| D970,882 S | 11/2022 | Watson | |
| 11,540,487 B2 | 1/2023 | Watson | |
| D979,225 S | 2/2023 | Watson | |
| D982,309 S | 4/2023 | Watson | |
| 11,771,209 B2 * | 10/2023 | Younan | A63B 21/0722 |
| | | | 482/8 |
| 11,812,724 B2 * | 11/2023 | Watson | A45F 3/04 |
| D1,013,285 S | 1/2024 | Wu | |
| D1,028,492 S | 5/2024 | Watson | |
| D1,032,189 S | 6/2024 | Zhuang | |
| 12,453,333 B2 | 10/2025 | Watson | |
| 2002/0124808 A1 | 9/2002 | Zampelli et al. | |
| 2003/0200937 A1 | 10/2003 | Muckleroy | |
| 2007/0102253 A1 | 5/2007 | Godshaw et al. | |
| 2007/0278263 A1 | 12/2007 | Zak et al. | |
| 2008/0149673 A1 | 6/2008 | Slater | |
| 2008/0216760 A1 | 9/2008 | Cannon et al. | |
| 2009/0159628 A1 | 6/2009 | McMullen | |
| 2009/0321481 A1 | 12/2009 | Licausi | |
| 2010/0084443 A1 | 4/2010 | Adelman | |
| 2010/0219222 A1 | 9/2010 | Winneur | |
| 2010/0243693 A1 | 9/2010 | Terry et al. | |
| 2011/0036301 A1 | 2/2011 | Mirsky | |
| 2011/0278338 A1 | 11/2011 | Darnell, II et al. | |
| 2013/0221051 A1 | 8/2013 | Hairston | |
| 2018/0139921 A1 | 5/2018 | Kath | |
| 2018/0139922 A1 * | 5/2018 | Watson | A01K 1/0254 |
| 2020/0060222 A1 | 2/2020 | Watson | |
| 2021/0145188 A1 * | 5/2021 | Thatcher | A45F 3/04 |
| 2022/0061262 A1 | 3/2022 | Watson | |
| 2022/0061263 A1 | 3/2022 | Watson | |
| 2022/0225592 A1 * | 7/2022 | Watson | A01K 1/029 |
| 2024/0306596 A1 | 9/2024 | Egbert | |

FOREIGN PATENT DOCUMENTS

| | | | | |
|---|---|---|---|---|
| CN | 2134816 | Y | | 6/1993 |
| CN | 203353366 | U | | 12/2013 |
| CN | 203493023 | | | 3/2014 |
| CN | 203493023 | U | * | 3/2014 |
| CN | 204733728 | U | | 11/2015 |
| CN | 205052485 | U | | 3/2016 |
| CN | 304922920 | | | 12/2018 |
| CN | 201830457586-3 | | | 4/2019 |
| CN | 202230312320-6 | | | 4/2023 |
| DE | 3916369 | A1 | | 11/1990 |
| DE | 20 2005 016 026 | U1 | | 1/2006 |
| DE | 20 2011 102 300 | U1 | | 1/2012 |
| DE | 20 2014 007 394 | U1 | | 4/2015 |
| DE | 20 2014 102 111 | U1 | | 9/2015 |
| EP | 0 719 513 | A1 | | 7/1996 |
| FR | 2 668 044 | A1 | | 4/1992 |
| GB | 2 436 735 | A | | 3/2007 |
| JP | 8-119168 | A | | 5/1996 |
| JP | 11-178623 | A | | 7/1999 |
| JP | 4391347 | B | | 12/2009 |
| JP | 2012-187352 | A | | 10/2012 |
| KR | 10-1003750 | B1 | | 12/2010 |
| KR | 301051144.0000 | | | 3/2020 |
| TW | M297624 | U | | 9/2006 |
| TW | M444711 | U1 | | 1/2013 |
| TW | M464079 | U | | 11/2013 |
| TW | M514722 | U | | 1/2016 |
| TW | I527541 | B | | 4/2016 |
| TW | I549632 | B | | 9/2016 |
| TW | 204339-0001 | | | 5/2020 |

OTHER PUBLICATIONS

K9 sport sack kolossus, posted at amazon.com, first available Feb. 16, 2021, retrieed on Aug. 15, 2021, online, https://www.amazon. com/K9-Sport-Sack_Adjustable_Veterinarian/dp/B08WR4ZBGC? th=1 (Year: 2021).

PetBonus pet front dog carriier backpack, posted at amazon.com, first available Apr. 1, 2022, retrieved on Aug. 15, 2021, online, https://www.amazon.com/PetBonus-Backpacks-Adjustable-Backpack-Easy-fit/dp/B09X1BWFLH (Year: 2022).

Smonth dog carrier backpack, posted at amazon.com, first available Jun. 22, 2022, retrieved on Aug. 15, 2021, online, https://www. amazon.com/dp/B0B23QP3CX/?_encoding=UTF8&pd_rd_i= B0B23QP3CX (Year: 2022).

K9 sport sack walk-on, posted at amazon.com, first available Feb. 10, 2022, retrieved on May 10, 2023, online, https://www.amazon. com/dp/B09S5F32D7 (Year: 2022).

Little chonk the maxine one dog backpack, posted at amazon.com, first available Feb. 16, 2023, retrieved on May 10, 2023, online, https://www.amazon.com/LITTLE-CHONK-Maxine-Backpack-Carrier/dp/BOBVZ623YV (Year: 2023).

Little chonk the maxine one s backpack, posted at amazon.com, first available Oct. 10, 2022, retrieved on May 10, 2023, online, https:// www.amazon.com/Maxine-Small-Backpack-Carrier-LITTLE/dp/ BOBHTD8MTS?th=1 (Year: 2022).

K9 Sport Sack: The World's Most Unique Dog Hauler; https://www. youtube.com/watch?v=eXCxplVal34.

https://www.k9sportsack.com/.

K9 Youtube Video; https://www.youtube.com/watch?v= MLN33LQtN7M.

Large Dog Backpack for Biking—YouTube; https://www.youtube. com/watch?v=EdERAhnl8_c.

Mystery Ranch Backpacks; https://web.archive.org/web/ 20160926234313/https:/bushcraftusa.com/forum/threads/mystery-ranch-comparison-sweet-pea-vs-the-3-day-assault-pack.93311/.

International Search Report and Written Opinion dated Feb. 15, 2023 from corresponding International Patent Application No. PCT/US2022/047457, 5 pages.

Written Opinion dated Feb. 15, 2023 from corresponding International Patent Application No. PCT/US2022/047457, 10 pages.

Extended European Search Report dated Jul. 15, 2025 from corresponding European Patent Application No. 22890613.7, 11 pages.

K9 sport sack knavigate, posted at amazon.com, first available Apr. 18, 2025, retrieved on Aug. 28, 2025, online, https://www.amazon. com/K9-Sport-Sack_Knavigate-Backpack-Style-dp/ B0F5HXZXB3 (Year: 2025).

(56) References Cited

OTHER PUBLICATIONS

Maxine one (small) dog carrier backpack, posted at littlechonk.com, first available Dec. 13, 2023, retrieved on Aug. 28, 2025, online, https://www.littlechonk.com/products/copy-of-the-maxine-one-bag-2?variant=44759861035222 (Year: 2023).

Meet the dog that started the dog backpack, posted at youtube.com, first available Aug. 3, 2022, retrieved on Aug. 28, 2025, online, https://www.youtube.com/shorts/zP69Zntbflg (Year: 2022).

The maxine one dog carrier by little chonk, posted at amazon.com, first available Oct. 19, 2023, retrieved on Aug. 28, 2025, online, https://www.amazon.com/Maxine-Small-Backpack-Carrier-LITTLE/dp/B0CLF5X6tZG?ref_=ast_sto_dp&th=1 (Year: 2023).

* cited by examiner

557

1000

1000

700

156

155

1000

BACKPACK FOR CARRYING ANIMALS

CROSS-REFERENCE TO RELATED APPLICATIONS

This application is a continuation of International Application No. PCT/US2022/047457, filed on Oct. 21, 2022, which claims the benefit of U.S. Provisional Application Ser. No. 63/275,526, filed Nov. 4, 2021. Both of the aforementioned applications are hereby incorporated by reference in their entireties.

BACKGROUND OF THE DISCLOSURE

1. Field of the Disclosure

The present disclosure relates to a backpack for carrying animals. More particularly, the present disclosure relates to a backpack for carrying pets in a main compartment or main body of the backpack, with the backpack having a tail port at or near a bottom portion of the backpack and a single space for the front limbs of the pet to protrude outside the backpack compartment or main body.

2. Description of the Related Art

Current backpacks for carrying pets have two holes for the front limbs of the pet to protrude through the backpack compartment in an attempt to increase the comfort of the pet. However, as these holes are always spaced apart and in the same fixed location on the pack, and since each pet is a unique shape and size, these holes may not line up perfectly with the limbs of each pet. Limbs can vary in size and the placement of the limbs relative to the width of the chest of the pet can vary as well. Forcing or placing the pets' limbs through these separate holes may cause discomfort to the pet when the holes do not align properly with the size and shape of the pet's limbs.

Current backpacks for carrying pets do not provide tail ports to allow the tail of the pet to protrude outside the body of the backpack, thereby causing discomfort to the pet while the pet is being carried within the pack.

Current backpacks have bodies or compartments that do not provide enough rigidity or adjustable compression to allow the pet to comfortably sit upright within the pack when being carried.

Current backpacks do not have multiple entry and exit points on the pack body or main compartment of the pack to allow the easy loading and unloading of a pet.

Current backpacks also lack multiple handles located at various convenient locations on the pack body, which makes handling the pack when loading, unloading or picking up or putting down the pack with the pet difficult.

Current backpacks do not have a brace that provides support for a pet's neck, and/or upper body which can cause discomfort to a pet, since the neck or upper body of the pet may sway back and forth due to momentum when the pet is being carried.

Additionally, a backpack that addresses or mitigates all or some of these aforementioned issues does not exist.

Thus, there is a need to address the above-mentioned problems.

SUMMARY OF THE DISCLOSURE

The present disclosure provides a backpack that addresses the aforementioned and other shortcomings of current backpacks for carrying animals and pets.

The present disclosure provides for a backpack ("pack") having multiple entry and exit points for easy loading and unloading of a pet into and out of the pack. Thus, the present disclosure additionally provides for a method to load and unload pets easily from the backpack disclosed herein.

The present disclosure also provides for such a pack that has a tail port and a space for the pet's front limbs to comfortably protrude from the pack.

The present disclosure also provides for such a pack that has enough rigidity and/or adjustable compression to enable a pet to comfortably sit up in the pack when loaded into the pack, and when carried.

The present disclosure still further provides for such a pack that has multiple handles located at convenient locations on the pack, which gives a user the ability to grab one or multiple areas of the pack when loading and unloading the pet into the pack and picking up or putting down the pack thereby increasing the ease of using the pack.

The present disclosure also provides for an embodiment in which the pack has a brace at the top of the pack that provides support for a pet's neck, and/or upper body.

The present disclosure also provides for such a pack that has breathable mesh at one or locations on the pack to allow ventilation of heat from the pack and prevents excess heat buildup inside the pack, thereby providing additional comfort to the pet.

The present disclosure provides for a pack with embodiments that can combine all or some of these aforementioned features.

DESCRIPTION OF EXEMPLARY EMBODIMENTS

Figures 1, 2, 3:
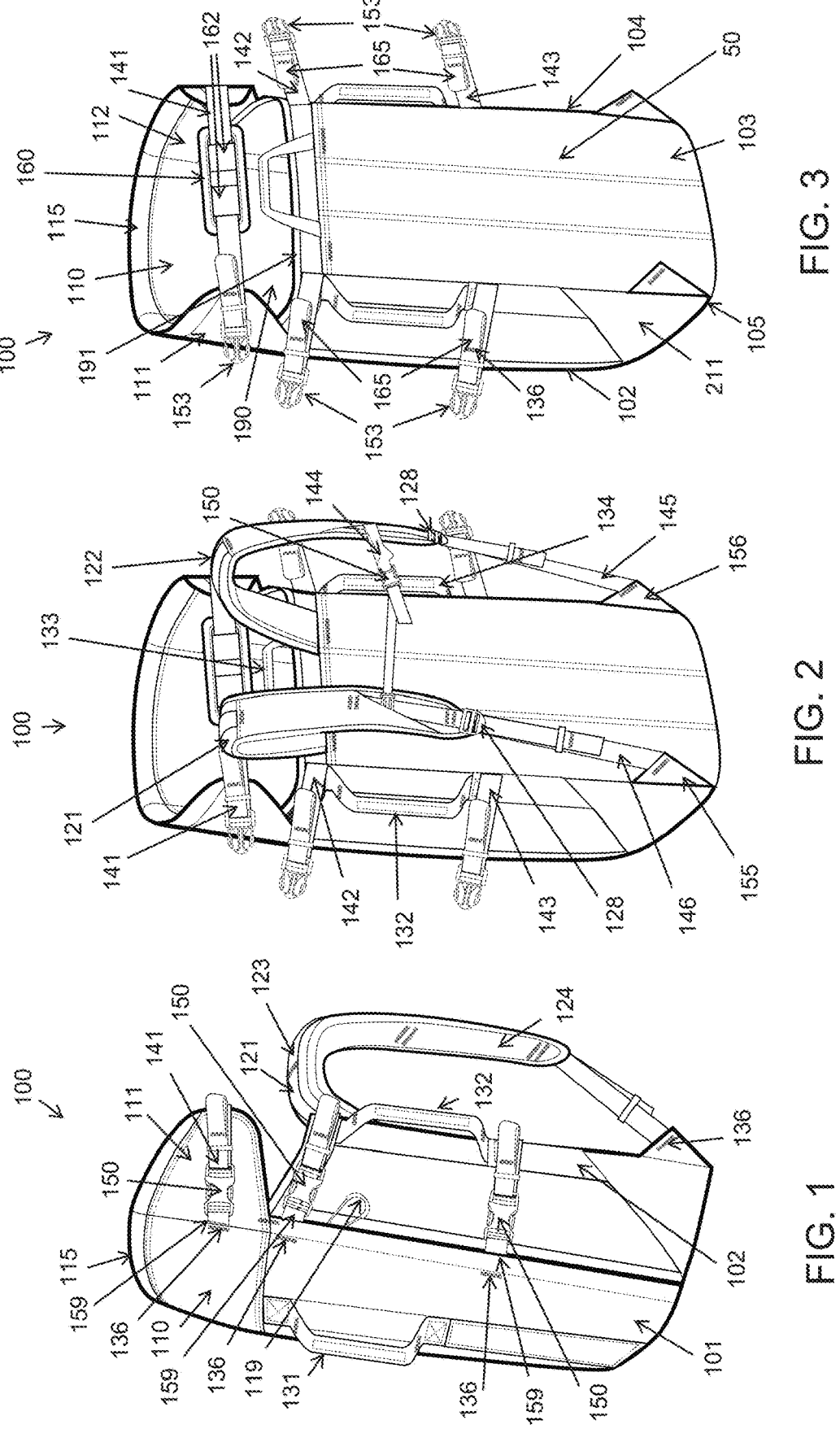
FIG. 1 is a side view illustrating an embodiment of the backpack for carrying animals.
FIG. 2 is a front perspective view of the backpack as shown in FIG. 1.
FIG. 3 is a front perspective view of the backpack as shown in FIG. 2 without the shoulder straps.

FIG. 1 shows the backpack generally represented by reference numeral 100. In some embodiments, such as shown in FIGS. 1-11, 13-16, and 19-24 backpack 100 has a main body 50 that can be composed of a number of panels, such as back panel 101, front panel 103 and side panels 102 and 104. When panels 101-104 are connected or attached together through various methods, such as but not limited to, sewing, bar tacks, adhesives, fabric welding (which utilizes heat and pressure to join pieces of fabrics), and other such methods well known in the art, the panels form the main body or main compartment 50 as shown in FIG. 3.

In some embodiments, backpack 100 can be formed as a singular unitary piece or container that does not require separate panels, but still provides a main body portion 50. This single unitary embodiment of main body portion 50 has the same function and strap attachments, yoke attachments, shoulder strap attachments, brace and tail port as the embodiment of main body 50 that is composed of separate panels.

Referring to FIGS. 1-3, when the panels 101-104 are connected as shown, shoulder straps 121 and 122 are connected to front panel 103 preferably by stitching, bar tacks 136 or any method well known in the art. Bar tacks 136 can be a series of stiches used to reinforce areas and connect separate layers of fabric together. Shoulder straps 121 and 122 both have an upper surface 123 and a lower surface 124.

In some embodiments, upper surface 123 can be made of materials such as 200D polyester spandex with a four-way stretch, and/or 600D nylon with basket weave. Lower surface 124 can be made of materials, such as polyester space knit mesh, to aid with breathability and heat ventilation. When upper and lower surfaces 123 and 124 are connected, preferably by stitching, bar tacks or any method well known in the art, a medium to high density foam is placed between the layers to provide padding and comfort for the user. Each shoulder strap 121 and 122 has a strap 146 and 145, respectively, that are attached to each shoulder strap preferably by stitching or bar tacks 136. The lower end of each strap 146 and 145 is connected or attached to fabric protrusions 155 and 156, respectively, preferably by a bar tack 136. The length of each strap 145 and 146 can be adjusted by a webbing slider 128, to allow for adjustments of the shoulder straps allowing for a tighter or loser fit.

In an embodiment of the present disclosure shown in FIGS. 1-3, there is a brace 115. Brace 115 is composed of brace panels 110, 111 and 112 that form a semicircular structure or brace. Brace panel 110 is an extension of back panel 101. Brace side panel 111 is connected to brace panel 110 and is adjacent to side panel 102. Brace, side panel 112 is connected to brace panel 110 on the opposite side of brace panel 111 and is adjacent to side panel 104. Brace 115 is connected to pack 100 by brace panel 110. Brace 115 prevents and/or mitigates the swaying motions of the upper body and/or neck area of a pet, when the pet is carried in the pack 100. Brace 115 also enhances the rigidity of the pack 100 and allows a pet to sit up easier in the pack 100 when being carried.

Figure 11:
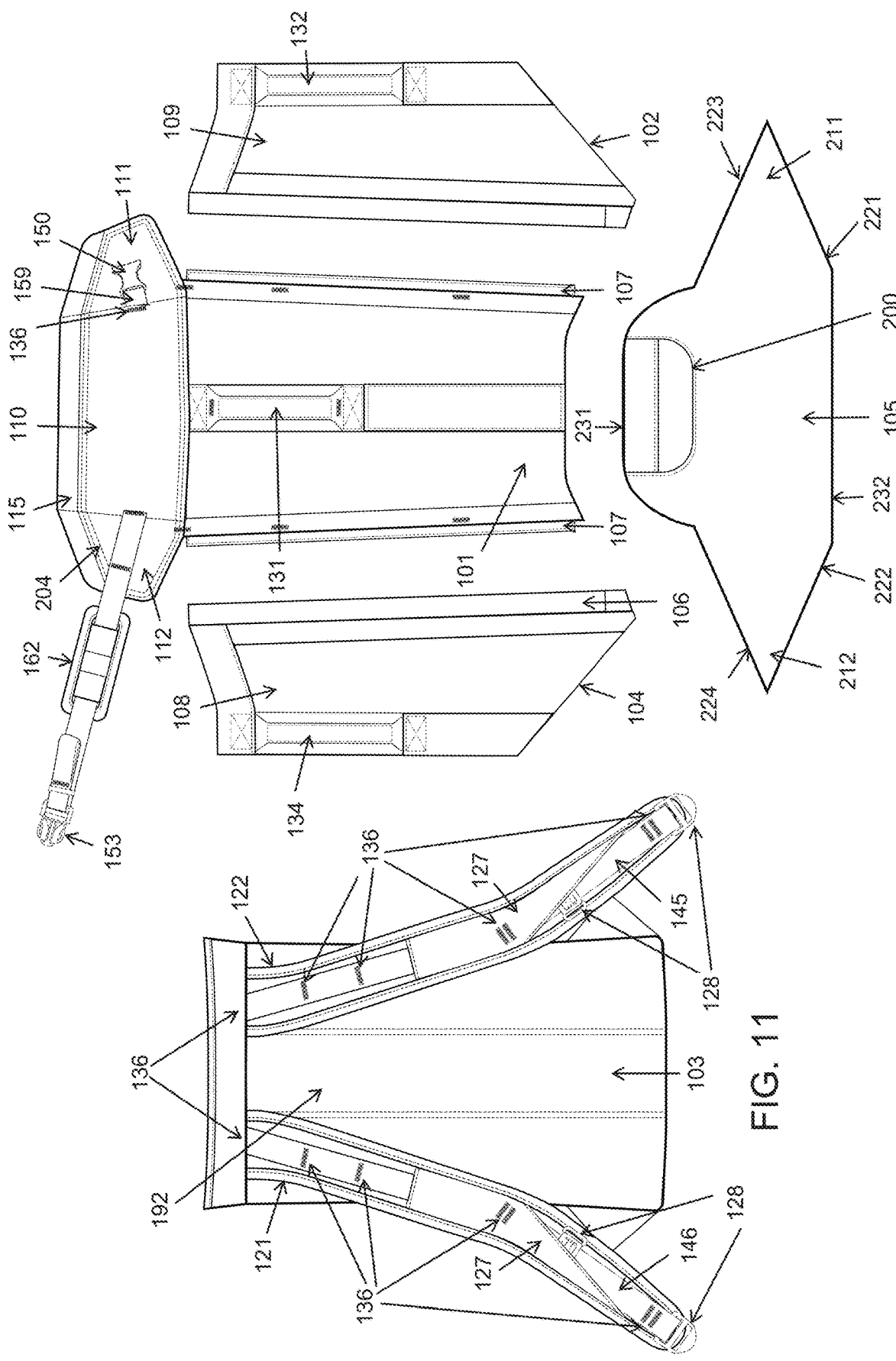
FIG. 11 shows the backpack of FIG. 1 disassembled into a front panel, back panel, bottom panel and side panels with the horizontal tail port as shown in FIGS. 9 and 10.

A yoke, such as yoke 160, is connected to the brace 115, as shown in FIG. 3. A nylon webbing strap 159 is connected on a first end, preferably by stitching or a bar tack 136, to brace panel 111 and connected on the other end to a female buckle 150. Nylon strap 141 is connected on a first end, preferably by stitching or a bar tack 136, to brace panel 112 as shown in FIG. 11, and is connected on the second end to male buckle 153. Strap 141 runs through a center portion of yoke 160. Specifically, top panels 162 are connected to a center portion of yoke 160 and create sleeves between panels 162 and yoke 160, through which strap 141 can be routed through. Yoke 160 can be adjusted towards brace panel 111 or 112 by moving the yoke over strap 141 in either direction when buckle 153 is connected to buckle 150. Yoke 160 provides compression and support to the upper chest and/or neck area of pet, when connected to brace 115. An additional strap length 165 can be provided, so that the length of strap 141 can be adjusted to provide more or less compression. Yoke 161 is another embodiment of a yoke used with pack 100 and is described in FIG. 8A below.

When yoke 160 or 161 is connected to brace 115, a singular hole 190 is created between an upper lip 191 near a top portion of front panel 103, and yoke 160 or 161, and portions of brace panels 111 and 112 of brace 115. This singular hole 190 defines a paw portal area, through which the front limbs of a pet are able to protrude out of pack 100 and towards the back of a user when the pack 100 is loaded with the pet therein and a user puts their arms through the shoulder straps 121 and 122 onto his/her back. In some embodiments, semicircular brace 115 can have brace side panels 111 and 112 slope downward from middle panel 110, so that when the yoke 160 or 161 is connected and buckled, the semicircular brace 115 has brace panels 111 and 112 nearer lip 191 than panel 110. The downward slope of the side brace panels 111 and 112 with respect to the center brace panel 110 can provide additional comfort to a pet and allow the pet to more easily look side to side when carried in the pack.

The paw portal 190 is advantageous over known packs for carrying animals since the paw portal does not use separate holes for each limb of the pet. Both front limbs of a pet can fit in the singular paw portal 190. In known packs that have two separate holes, one for each limb, these holes are in fixed locations no matter the size and shape of the pet. The fixed locations of the separate holes in known packs can cause pets discomfort by forcing limbs into awkward angles and positions when the separate holes for each limb do not align with limbs of the pet. In contrast, the paw portal of the present application provides increased comfort to the pet, since the paw portal is large enough to accommodate a range of pets with different dimensions and limb sizes in the pack 100.

Backpack 100 has handles 131, 132, 133 and 134 spaced apart on different areas of the pack 100 to increase the ease of handling and using the pack, namely when a user raises or lowers, or loads or unloads, a pet into and out of the pack 100. Handle 131 is connected to a center portion of back panel 101, and in an area near the brace 115. Handle 132 is connected to panel 102, with a top portion of handle 132 connected near lip 191. Handle 133 is connected to a top portion of front panel 103, near lip 191. Handle 134 is connected to panel 104, with a top portion of handle 134 connected near lip 191. Handles 131-134 will be described further below with respect to FIGS. 4, 5, 6A and 6B.

Pack 100 has a first compression strap 142 connected at a first end at the interface between panel 103 and 102, preferably with stitching or bar tacks 136, and is connected at a second end to a male buckle 153. Male buckle 153 is connected to a female buckle 150 that is in turn connected to a strap 159 at one end. The other end of strap 159 is connected to pack 100 at the interface between panel 102 and 101, preferably with stitching or bar tack 136. An additional strap length 165 is preferably provided, so that the length of strap 142 can be adjusted to provide more or less compression.

A second, identical strap 142, on the opposite side of the pack 100, has a first end that is connected to pack 100, preferably with stitching or bar tacks 136 at the interface between panel 103 and 104. The second strap 142 is connected at a second end to a male buckle 153. The male buckle 153 is connected to a female buckle 150, that is in turn connected to a strap 159 at one end. The other end of strap 159 is connected to pack 100 at the interface between panel 104 and 101 with stitching or bar tack 136. An additional strap length 165 is preferably provided, so that the length of strap 142 can be adjusted to provide more or less compression.

The first compression strap 142 is located above handle 131. The second compression strap 142 is located above handle 134.

Pack 100 has a third compression strap 143 connected at a first end at the interface between panel 103 and 102, preferably with stitching or bar tacks 136, and is connected at a second end to a male buckle 153. Male buckle 153 is connected to a female buckle 150, that is in turn connected to a strap 159 at one end. The other end of strap 159 is connected to pack 100 at the interface between panel 102 and 101, preferably with stitching or bar tack 136.

A fourth strap 143 identical to the third strap 143, is on the opposite side of the pack 100, and has a first end that is connected to pack 100, preferably with stitching or bar tacks 136, at the interface between panel 103 and 104. The fourth strap 143 is connected at a second end to a male buckle 153. The male buckle 153 is connected to a female buckle 150, that is in turn connected to a strap 159 at one end. The other end of strap 159 is connected to pack 100 at the interface between panel 104 and 101, preferably with stitching or bar tack 136.

The third compression strap 143 can be located below handle 132. The fourth compression strap 143 can be located below handle 134.

In some embodiments, first, second, third and fourth straps 142 and 143 are of a fixed length, and when they are connected via the male and female buckles 153 and 150, provide compressive force or forces on the body 50 of pack 100.

In some embodiments, first, second, third and fourth straps 142 and 143 are of an adjustable length, and when connected via the male and female buckles 153 and 150, provide adjustable compressive forces on the body 50 of pack 100, based on how much length is removed from each strap. The more length that is removed, the short the straps become, and more compression is added. Accordingly, if length is added to the straps, compression is decreased. The compressive forces add additional rigidity to the pack 100 and allows a pet to sit up comfortably and more easily when carried in pack 100 and minimizes or prevents the pet from sagging in the pack 100.

A first sternum strap 144 is connected or attached at a first end to strap 145 and at a second end to a male buckle 153. A second sternum strap 144 is connected or attached at a first end to strap 146 and at a second end to a female buckle 150. When the first and second sternum straps 144 are connected via the buckles 150 and 153, a user is provided with additional support and compression at the sternum or chest region. The straps 144 are adjustable so that the length can be increased or decreased to provide more or less compression. Embodiments of the sternum strap are described below and in FIGS. 7A and 7B.

In some embodiments, straps 141, 144, 142, 143, 145 and 146 are composed of nylon webbing, and can be 25 mm nylon flat twill webbing.

A first zipper 106 is located between the interface of panel 104 and 101, and second zipper 106 is located between the interface of panel 101 and 102 as shown in FIG. 11. A zipper pull 119 is attached to each zipper 106. The first and second zipper 106 provide side entry and side exit points for the loading and unloading of a pet. See FIG. 11 below for further description and illustration of the zippers 106. Further the pet can be loaded and removed from the top of the pack 100 at lip 191, when the yoke 160 or 161 is disconnected from the brace or kept connected and loosened. Providing multiple entry and exit points for loading and unloading a pet, provides a user multiple options that they can choose from based on their preferences and how their pet behaves. Some users may find it easier to open one or both of the side zippers 106 and load or unload their pet through the side zippers 106, and some users may choose to use the top of the pack 100 to load and unload the pet.

In a preferred embodiment, the method of loading the pet into the pack 100 is to unzip both zippers 106 on each side of the pack completely, open up or filet the pack 100 on the ground, place the pet on the interior surface of the back panel 103 in a prone position, fold the front panel 101 up onto the pet's back, zip up both zippers 106, buckle the side straps 142 and 143 on each side of the bag, buckle the strap 141 with the collar yoke 160 or 161, and use all or some of the grab handles 131, 132, 133 or 134, alone or in combination to hoist the pack 100 with the pet onto a user's back. The straps 141, 142, 143 and 144 can be tightened and loosened as needed.

Figures 4, 5, 6A:
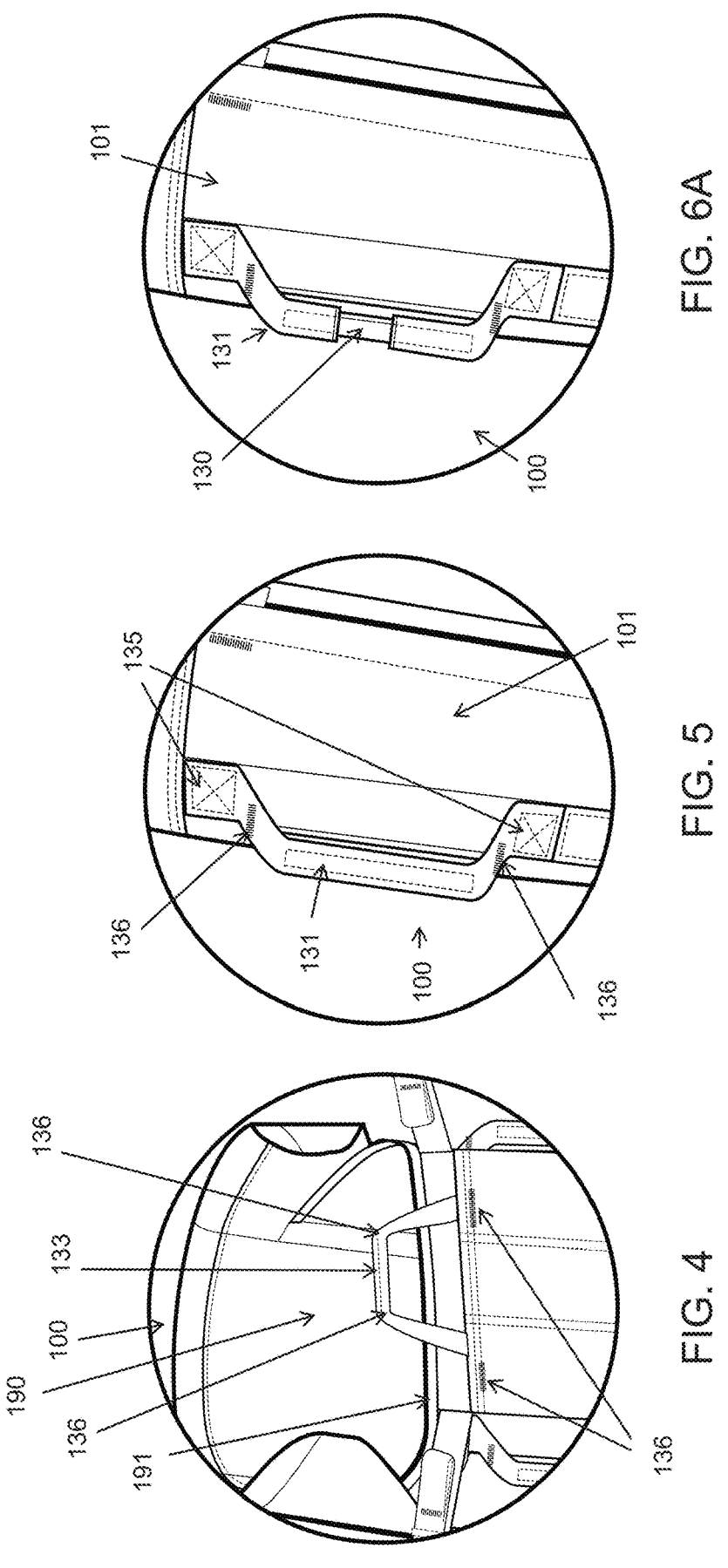
FIG. 4 is a partial view of the backpack of FIG. 1 illustrating a top handle of the backpack.
FIG. 5 is a partial view of the backpack of FIG. 1 illustrating a handle of the backpack.
FIG. 6A is a partial cross-sectional view of the handle as shown in FIG. 5.

Referring to FIG. 4, top handle 133 is shown. Handle 133 is connected to pack 100, preferably by stitching or bar tacks 136, near a top portion of panel 103 near lip 191 as shown. The outer material of the handle 133 can be a hollow tubular nylon 138, that is packed at the center portion with a cylindrical foam or padded insert 130 as shown in FIG. 6A. The cylindrical insert 130 when packed in the hollow tubular nylon casing of handle 133, can have bar tacks 136 placed on either side of the cylindrical insert and into the nylon casing to prevent the insert from moving off center when being used.

Referring to FIG. 5, side handle 131 is shown. The construction of handle 131 and attachment of handle 131 to pack 100, is identical to the construction and attachments of handles 132 and 134 to pack 100, except for the location of the handles on pack 100 as described above and shown in the figures. Handle 131 is connected to pack 100, preferably by stitching and/or bar tacks 136, to panel 101. The outer material of the handle 131 can be a hollow tubular nylon 138, that is packed at the center portion with a cylindrical foam or padded insert 130 as shown in FIG. 6A. The cylindrical insert 130 when packed in the hollow tubular nylon casing of handle 131, can have bar tacks 136 placed on either side of the cylindrical insert and into the nylon casing to prevent the insert from moving off center when being used. Box and cross stitches 135 are also used to reinforce the attachment of handle 131 to pack 100 on panel 101 as shown. Handles 132 and 134 are connected or attached to their respective panels or areas of the pack 100, preferably with bar tacks 136 and/or box and cross stitches 135 as shown in the figures and described herein.

Figures 6B, 7A:
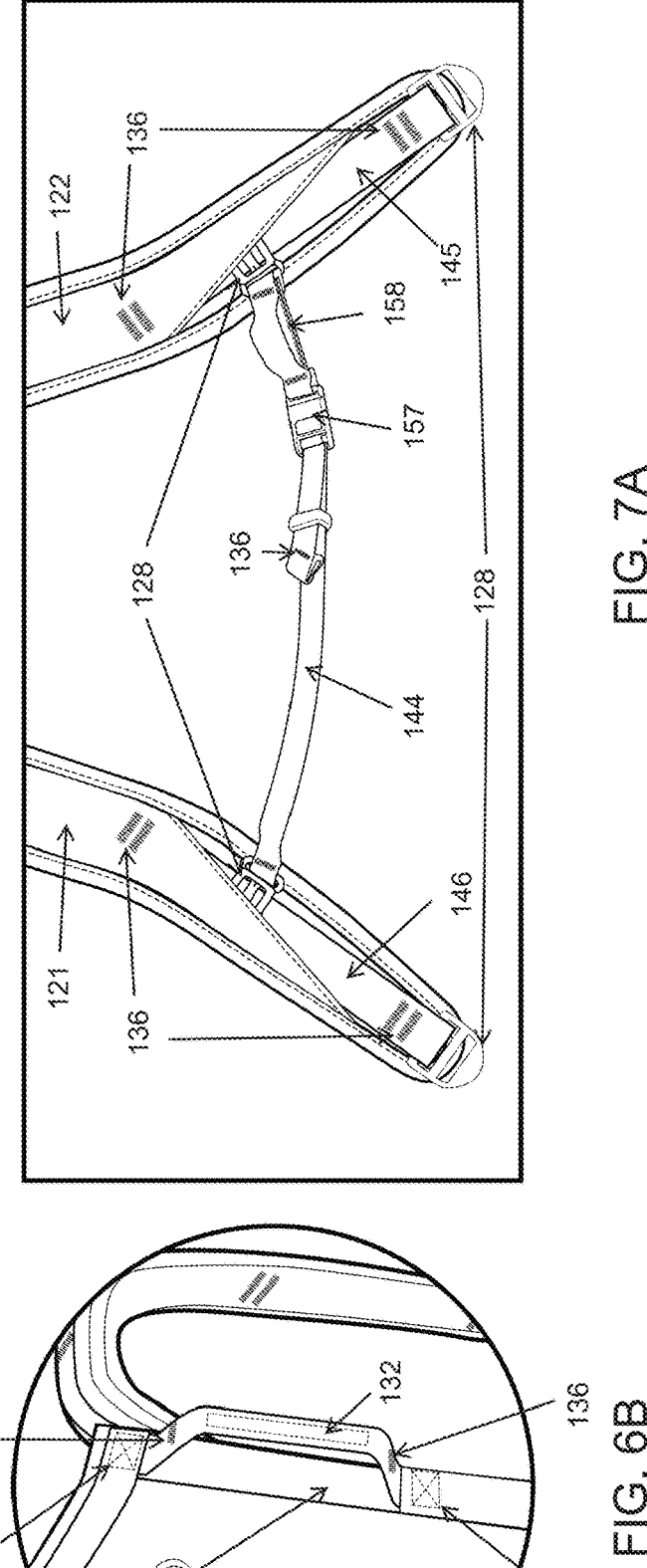
FIG. 6B is a partial view of the backpack of FIG. 1 illustrating a side handle of the backpack.
FIG. 7A is a front partial view of an embodiment of a sternum strap and buckle used with the backpack.

FIG. 6B shows a view of one of the side handles 132, as described above, connected to panel 102. Handle 134 is identical to handle 132, except that handle 134 is instead connected to panel 104.

Referring to FIG. 7A, an assembly for an embodiment of a sternum strap is shown. A webbing slider 128 is connected or attached on one end to strap 145 on shoulder strap 122, and on the opposite end of the sternum strap, an identical webbing slider 128 is connected or attached to strap 146 on shoulder strap 121 as shown in FIG. 11. A chest strap 144 is connected to each webbing slider 128 and can connect and disconnect each side together with male and female buckle attachments 153 and 150 that form buckle assembly 157. The webbing sliders 128 can be used to the adjust the height of the sternum straps relative to each of the shoulder straps 121 and 122 based on the user's preference. In some embodiments, elastane 158 provides stretch across the sternum strap assembly to maximize ergonomic comfort of the user.

Figure 7B:
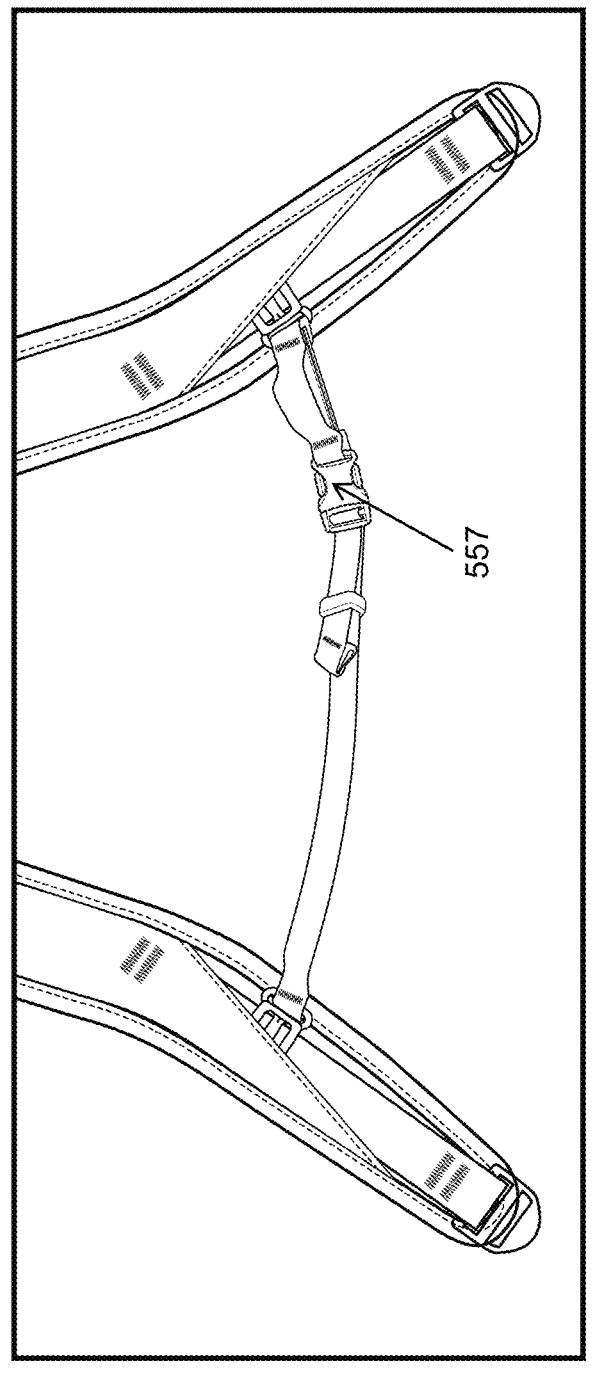
FIG. 7B is a front partial view of an embodiment of a sternum strap and buckle used with the backpack.

Referring to FIG. 7B, an alternate buckle 557 is provided in place of buckle 157, with all other structures being identical to and described above in FIG. 7A. Buckle 557 is a side release buckle. In some embodiments, buckle 157 has a magnet to aid in the connection of the buckle to the strap. In contrast, buckle 557 does not have a magnet, and can be ergonomic for a user.

Figure 8A:
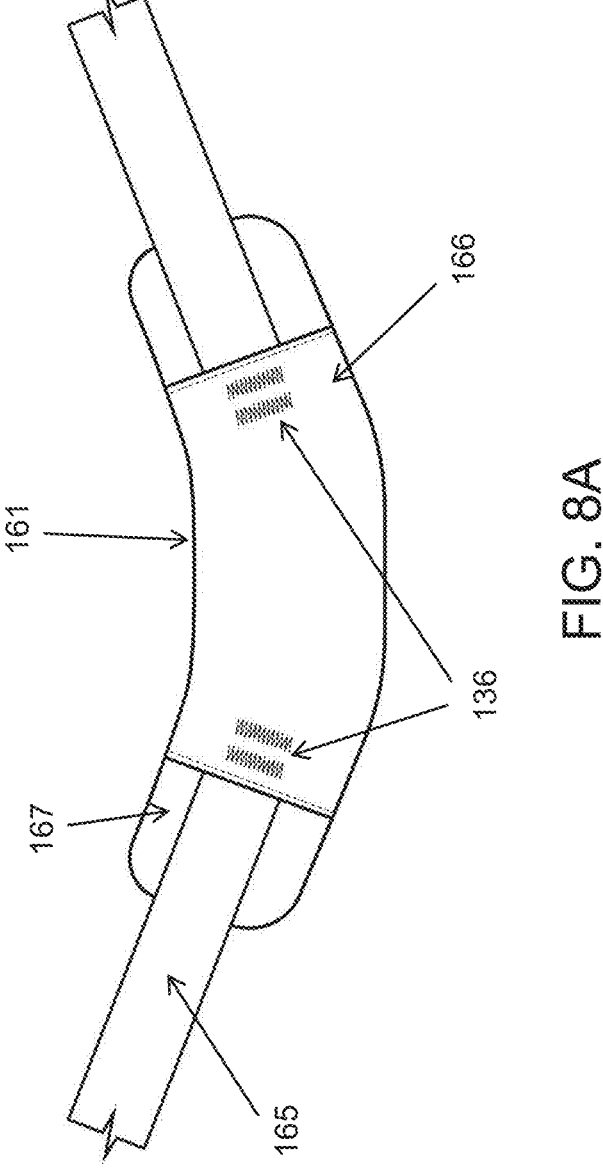
FIG. 8A is a front view of an embodiment of a yoke attachment used with the backpack.

Referring to FIG. 8A, the embodiment of yoke 161 is shown. Unlike yoke 160, yoke 161 has a top layer 166 and a bottom layer 167 fixed together, preferably with stitching and/or bar tacks 136, and can have double bar tacks 136 per side for added strength. As the strap 141 passing between the top layer 166 and bottom layer 167 is fixed, any adjustments to the yoke 161 will be made by adjusting the length of strap

141 on either side of yoke 161. Yoke 161 is preferably curved to help contour and secure the yoke 161 to a pet's chest and/or neck area when connected to pack 100 as described above. Yoke 161 can be connected or attached to pack 100 with male and female buckle attachments 153 and 150. In some embodiments, top layer 166 can be made of 200D polyester spandex mesh that has a four way stretch. In some embodiments, bottom layer 167 is made of the same material as the main exterior fabric of pack 100 such as 600D or 900D nylon.

Figures 8B, 9, 10:
FIG. 8B is a front view of another embodiment of a yoke attachment used with the backpack.
FIG. 9 is a partial bottom perspective view of the backpack as shown in FIG. 1, showing a horizontal tail port being closed.
FIG. 10 is a partial bottom perspective view of the backpack as shown in FIG. 9, showing the tail port being open.

Referring to FIG. 8B, the embodiment of yoke 162 as described above is shown. Yokes 161 and 162 can have double bar tacks 136 to connect to panel 112 as shown in FIG. 8B.

Referring to FIG. 9, the bottom panel 105 is shown connected or attached to panels 101, 102, 103 and 104. However, as described above, pack 100 does not need to be constructed with side, front, back and bottom panels, and can instead be a single unitary body 50. Bottom panel 105 has a horizontally oriented tail port 200 at an area close to the interface between panels 105 and 101. The tail port 200 has an upper lip 201 and a bottom lip 202.

Referring to FIG. 10, top lip 201 and bottom lip 202 can be separated to form a hole 205, to allow the tail of the pet to protrude from pack 100. Upper and bottom lips 201 and 202 can have stitching 203 to ensure the structural stability of the tail port in the region of hole 205 and along the perimeter of tail port 200. In some embodiments, upper and lower lip 201 and 202, respectively, can be made of a soft sturdy material, such as Neoprene, to ensure the comfort of the pet, when the pet's tail is protruding through hole 205. Tail port 200 offers increased comfort to pets with tails, so that when the pet sits up in the pack 100, the tail is not compressed or squeezed in a tight space.

Referring to FIG. 11, backpack 100 is shown disassembled into panels 101, 102, 103, 104 and 105.

Panel 102 is connected, preferably by stitching or other methods known in the art, to panel 101 on a first end as shown in the figures. At the interface between panels 102 and 101 is zipper 106 that can be opened or closed to provide an entry or exit point into and out of the pack 100 for a pet. Zipper 106 can include a zipper assembly with a coil zip and automatic lock slider and zipper stop. In some embodiments, zipper 106 is a YKK zipper and zipper stop. Panel 102 can have a portion 109 that can be made of a different material than the rest of panel 102. Portion 109 can a breathable mesh material such as polyester spacer knit mesh or other similar materials known in the art. Portion 109 allows the heat buildup within the body 50 to ventilate or dissipate out of pack 100 when the pet is carried in the pack. Panel 102 is connected, preferably by stitching or other methods known in the art, to panel 103 on a second end as shown in the figures.

Panel 104 is connected on a first end, preferably by stitching or other methods known in the art, to panel 101. At the interface between panels 104 and 101 is zipper 106 that can be opened or closed to provide an entry or exit point into and out of the pack 100 for a pet. Zipper 106 can include a zipper assembly with a coil zip and automatic lock slider and zipper stop. In some embodiments zipper, 106 is a YKK zipper and zipper stop. Panel 104 can have a portion 108 that can be made of a different material than the rest of panel 104. Portion 108 can be a breathable mesh material such as polyester spacer knit mesh or other similar materials known in the art. Portion 108 allows the heat buildup within the body 50 to dissipate out of pack 100 when the pet is carried in the pack. Panel 104 is connected on a second end, preferably by stitching or other methods known in the art to panel 103 as shown in the figures.

Panel 101 has an inner zipper guard 107 on each side of the panel 101. When connected to panels 102 and 103, zipper guard 107 protects and covers zippers 106. Zipper guards 107 can reduce or prevent animal hair, fur or other debris from getting into the zippers 106 and can thereby ensure that the zippers maintain their function as the pack 100 is used.

Panel 103 has a portion 192 that is in contact with a user's back when worn. Portion 192 is made of a breathable material, such as polyester spacer knit mesh or 200D polyester spandex with four-way stretch.

In some embodiments, strap 141 of yoke 160 and 161 is attached to brace 115 with double bar tacks 136 at panel 112 as shown in FIGS. 8B and 11. In some embodiments, panels 110, 111 and 112 are reinforced with stitching 204 around the perimeter of brace 115 as shown in FIG. 11.

Panel 105 is a bottom panel that is connect by stitching or other methods known in the art on a first end 231 to panel 101, on a second end 232 opposite to the first end 231 to panel 103. Bottom panel 105 has side protrusions 211 and 212. Protrusion 211 is connected to panel 102 at edge 223 and connected to panel 103 at edge 221. Protrusion 212 is connected to panel 104 at edge 224 and connected to panel 103 at edge 222. Protrusion 155 is connected to panel 105 at edge 221, and protrusion 156 is connected to panel 105 at edge 222, as shown in FIGS. 1-3.

In some embodiments, bottom panel 105 is a single layer composed of 600D or 900D nylon. Bottom panel 105 is a bottom panel that has tail port 200 disposed at a location near the interface between panel 105 and 101 so that when the pet is loaded into pack 100 and faces forward towards the shoulder straps, the tail of the pet can protrude through the hole 205 of tail port 200. Bottom panel 105 is a surface to rest the hind limbs of the pet when the pet sits upright in the pack 100.

In some less preferred embodiments, panel 105 does not have a tail port 200 and is simply a bottom panel or base for the pet to sit on when being carried. Tail port 200 can also be located at a bottom portion of panel 101 near the interface of panels 101 and 105.

Panels 101, 102, 103, 104 and 105 collectively form the main body 50 of pack 100 when connected together as shown in the figures.

Shoulder straps 121 and 122 are connected, again preferably by stitching, or bar tacks 136 or other methods known in the art, to a top portion of panel 103 near lip 191. In some embodiments, lip 191 can be a softer material, such as neoprene, than the rest of pack 100.

Each strap 145 and 146 is connected to shoulder strap 121 and 122, respectively, at various locations of shoulder straps 121 and 122 as shown, such as at the top middle and bottom of strap 121 and 122. A flap 127 partially covers the strap 145/146 and an upper webbing slider 128. Upper webbing slider 128 allows a height adjustment of the sternum strap 144. Lower webbing slider 128 allows the length adjustment of strap 145/146 to increase or decrease based on a user's preference so as to loosen or tighten the shoulder strap 121 and 122. The lower end of strap 146 is connected to protrusion 155 and the lower end of strap 145 is connected to protrusion 156.

In some embodiments, the materials of the outer or exterior portion of pack 100, except where otherwise stated above, are made with a resilient and tear resistant material such as 600D or 900D nylon.

In some embodiments, the materials of the inner portion of pack 100, except where otherwise stated, can be made with a rip resistant material such as 210D nylon, or 210D honeycomb Rip-Stop lining.

In some embodiments, the materials of panel 101 can be reinforced with foam lining between the outer exterior layer and interior layer. In some embodiments, this foam is a 1 cm thick polyurethane (PU) foam.

In less preferred embodiments, only one shoulder strap is used with backpack 100, and not two. The placement of the singular shoulder strap can be attached as described above for the embodiment of the pack 100 with two straps, or the singular shoulder strap can be modified to be of a diagonal placement and attachment from the top of panel 103 to one of the protrusions 155 or 156.

Figure 12:
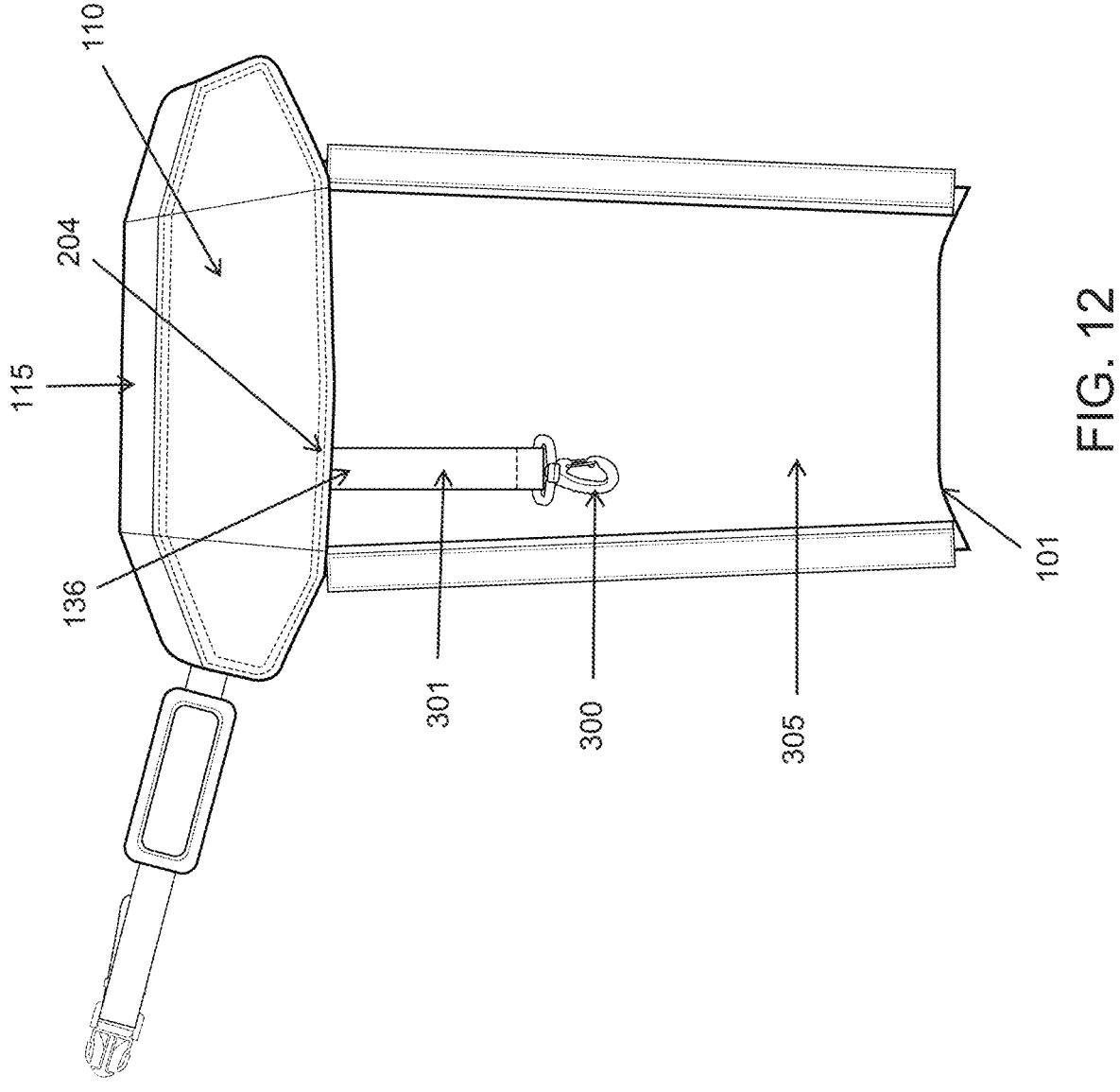
FIG. 12 is a front view that illustrates the internal side of a back panel of the backpack of FIG. 1, with an internal collar clip.

Referring to FIG. 12, an interior surface 305 of panel 101 is shown, having a collar clip 300 connected or attached by strap 301 to pack 100 at the interface between panel 101 and 110, preferably with stitching 204 and/or bar tack 136. Collar clip 300 is an internal clip that can connect to a pet's collar and ensure the pet does not leave the pack without first being disconnected from the clip 300. Collar clip 300 is located internally in the main body 50 and acts to prevent the animal from escaping the pack.

Figures 13, 14:
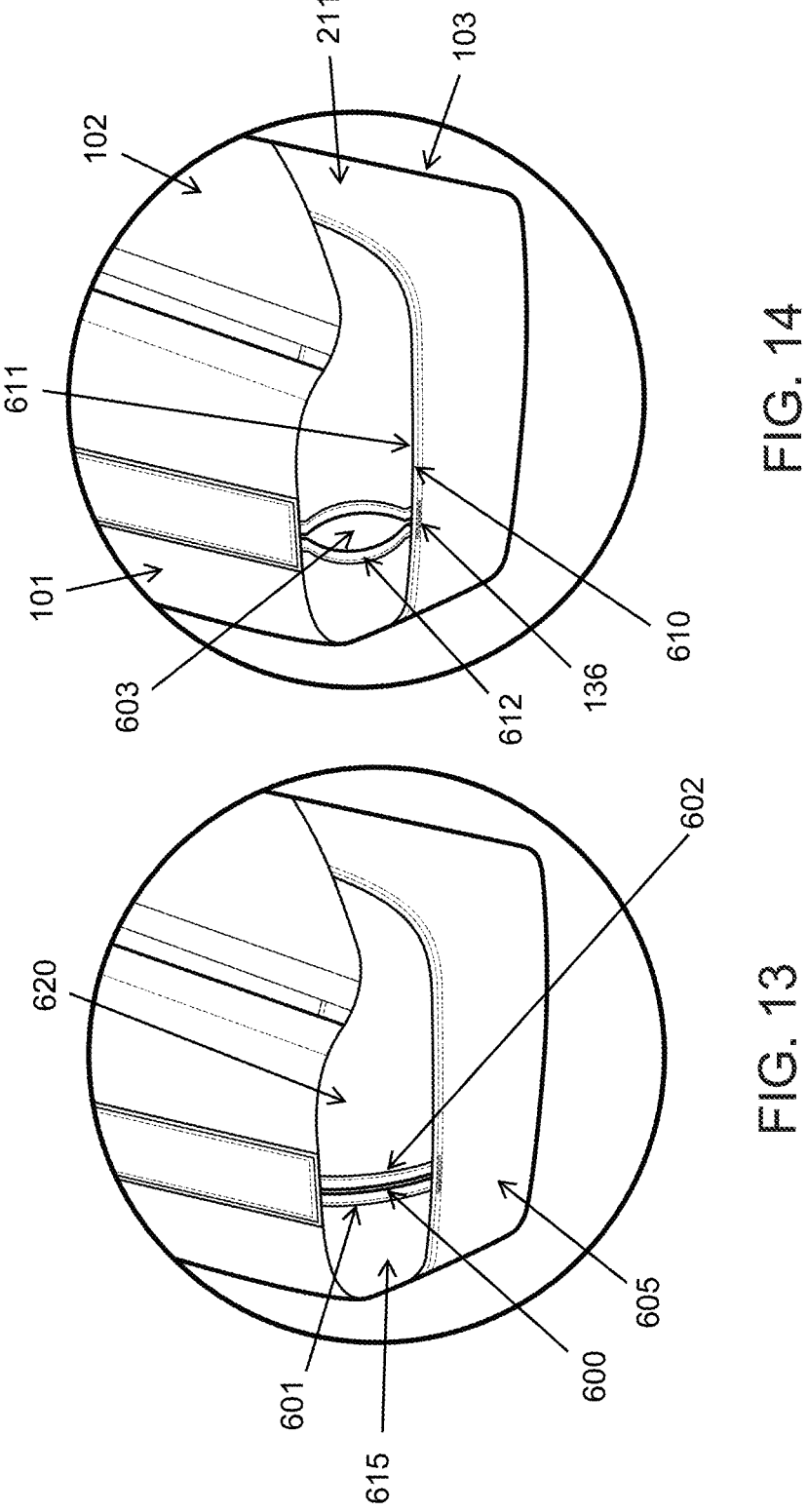
FIG. 13 is a partial bottom perspective view of the backpack as shown in FIG. 1, showing an embodiment of a vertical tail port being closed.
FIG. 14 is a partial bottom perspective view of the backpack as shown in FIG. 13, showing the tail port being open.

FIG. 13 shows an alternative bottom construction for backpack 100, replacing bottom panel 105 with three separate panels 605, 615 and 620. Horizontal tail port 200 is replaced with vertically oriented tail port 600. The bottom panels 605, 615 and 620 are shown attached to panels 101, 102, 103 and 104. However, as described above, pack 100 does not need to be constructed with side, front, back and bottom panels, and can instead be a single unitary body 50.

Referring to FIG. 14, side lip 601 and side lip 602 can be separated to form a hole 603, to allow the tail of the pet to protrude from pack 100. Side lips 601 and 602 can have stitching 612 to ensure the structural stability of the tail port in the region of hole 603 and along the perimeter of tail port 600. Panels 605, 615 and 620 are joined at edges 611 and 610 with stitching, and bar tack 136. In some embodiments, side lips 601 and 602, respectively, can be made of a soft sturdy material, such as neoprene, to ensure the comfort of the pet, when the pet's tail is protruding through hole 603. In some embodiments the neoprene can be made from three layers consisting of Polyester-Lycra fabric, SBR FOAM and Polyester-Lycra fabric. The neoprene provides durability, cushioning and elastomeric properties to the tail port. The panels 605, 615 and 620 are not composed of neoprene. Tail port 600 offers increased comfort to pets with tails, so that when the pet sits up in the pack 100, the tail is not compressed or squeezed in a tight space. In some embodiments, the vertical tail port 600 offers improved ingress and egress for the pet, allowing improved access that allows a larger range of tail size to fit into the vertical tail port 600, as compared to the horizontal tail port 200. The vertical tail port 600 can also offer increased comfort for dogs, minimizing pressure points that would constrict circulation.

Figure 15:
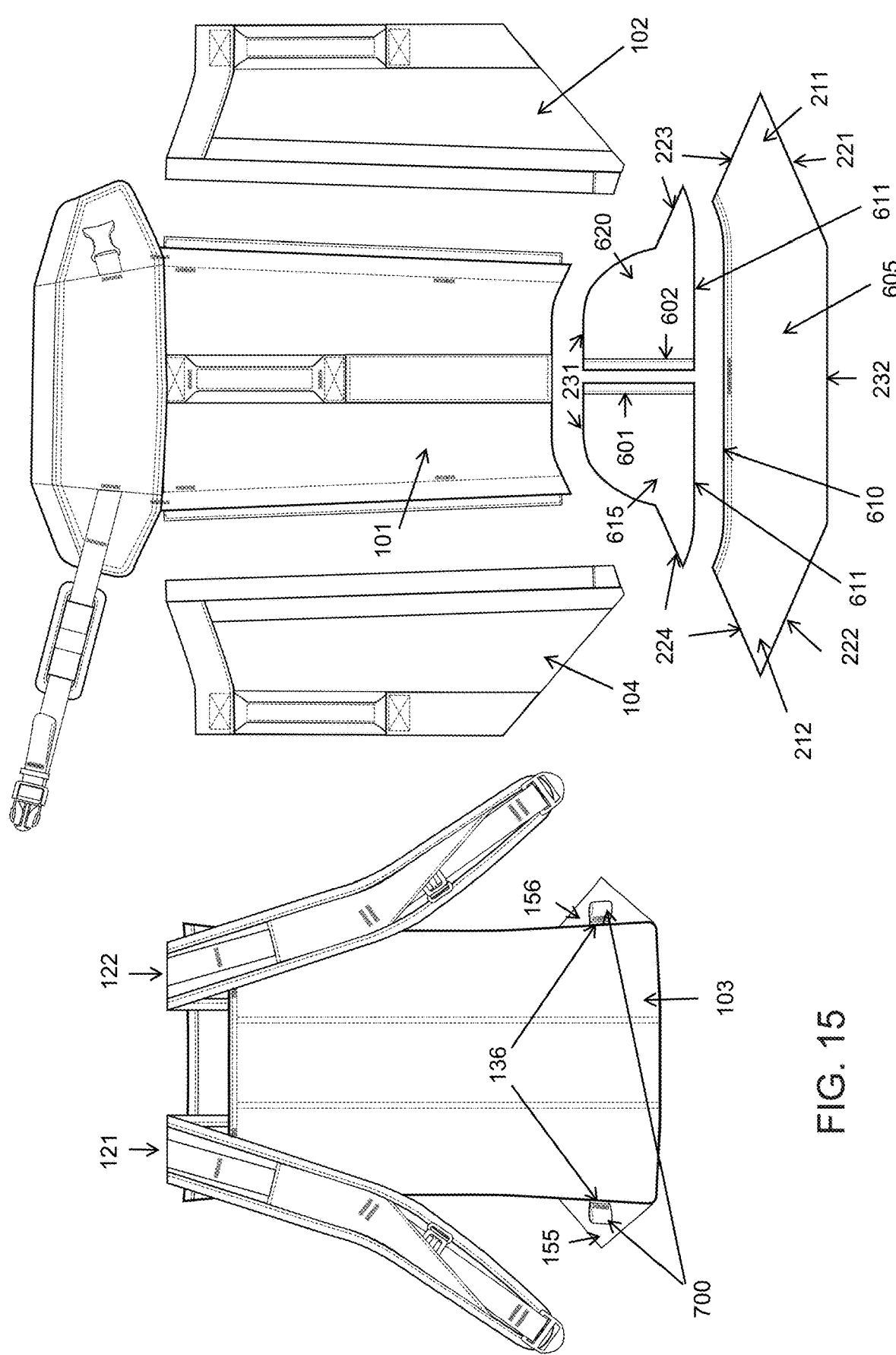
FIG. 15 shows the backpack of FIG. 1 disassembled into a front panel, back panel, bottom panels and side panels, with the vertical tail port as shown in FIGS. 13 and 14.

Referring to FIG. 15, backpack 100 is shown disassembled into panels 101, 102, 103, and 104. FIG. 15 is identical to FIG. 11, with the addition of loop attachments 700 connected to protrusions 155 and 156, by bar tacks 136, and as described above in FIGS. 13 and 14, bottom panel 105 is replaced by three separate panels 605, 615 and 620. Horizontal tail port 200 is replaced by vertical tail port 600. Panels 605, 615 and 620 are joined together at interface 611 and 610 with stitching, and bar tack 136. Panels 615 and 620 are connected by stitching or other methods known in the art to panel 101 at edge 231. Panel 605 is connected at end 232 to panel 103. Bottom panel 605 has side protrusions 211 and 212. Protrusion 211 is connected to panel 102 at edge 223 and connected to panel 103 at edge 221. Protrusion 212 is connected to panel 104 at edge 224 and connected to panel 103 at edge 222. Protrusion 155 is connected to panel 605 at edge 221, and protrusion 156 is connected to panel 605 at edge 222. Panels 615 and 620 also have edges 224 and 223 that are connected to panels 104 and 102, respectively.

Figures 16, 17, 18:
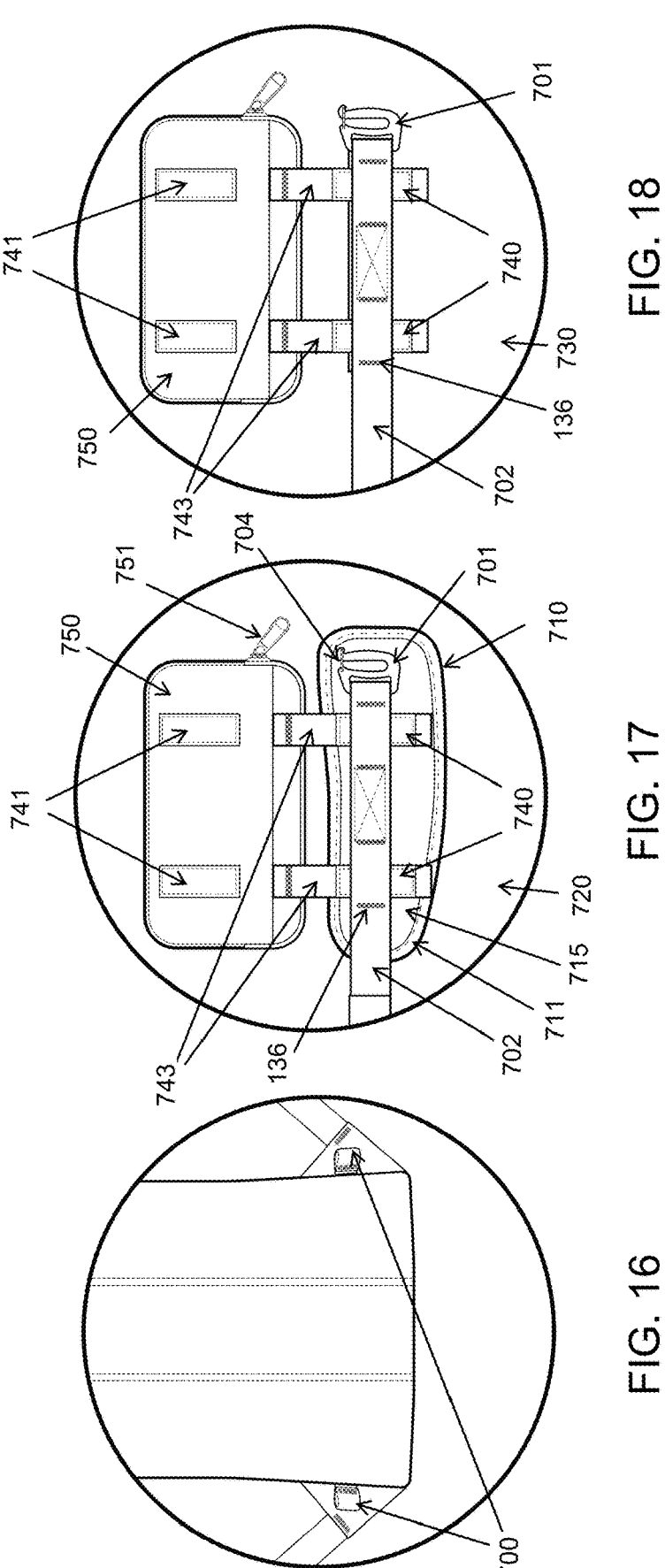
FIG. 16 is a partial front view showing the backpack of FIG. 1 with loop attachments.
FIG. 17 is a partial side view of a hip belt connected to an attachable storage compartment.
FIG. 18 is a partial side view of a waist belt connected to an attachable storage compartment.

FIG. 16 is a partial front view of the backpack 100 showing loop attachments 700 connected to protrusions 155 and 156, by bar tacks 136.

FIG. 17 shows a partial view of hip belt 720 and storage compartment 750, before compartment 750 is fully connected to hip belt 720. Hip belt 720 has a strap 702, that is looped through an opening in hook 701, and folded back to be reattached to itself and hip pad 710 by one or more bar tacks 136. In some embodiments, there are four bar tacks 136 attaching the strap 702 to itself and to hip pad 710 as shown. Hook 701 has a retaining device 704, to ensure that once hook 701 is connected to loop 700, the hip belt 720 will not disconnect without a user manually disconnecting the hip belt from backpack 100. In some embodiments, retaining device 704 is a snap hook, or metal spring gate mechanism.

Hip pad 710 has a cushioned or padded portion 715 that is outlined by stitching 711. Stitching 711 enables the padding to remain in place. Storage compartment 750 has straps 743 connected to the storage compartment. The ends of straps 743 have portions 740 that are either hook or loop connections, that are used to quickly attach to portions 741 that are also either hook or loop connections located on the compartment 750. The straps 743 are threaded through openings in the strap 702 created by the absence of the bar tacks 136, and then folded back onto itself to connect hook/loop portion 740 to hook/loop portion 741. Also, zipper 751 enables a user to open and close compartment 750. Compartment 750 can be used for additional storage for backpack 100 and can be used for among other things to hold snacks, and other items.

FIG. 18 shows a partial view of waist belt 730 and storage compartment 750, before compartment 750 is connected to waist belt 730. Waist belt is identical to hip belt 720 but is not attached to a hip pad 710. In some embodiments, strap 702 in both the hip belt and waist belt is a 25 mm Nylon Webbing. The hip pad can be made from a closed cell foam such as EVA foam.

Figure 19:
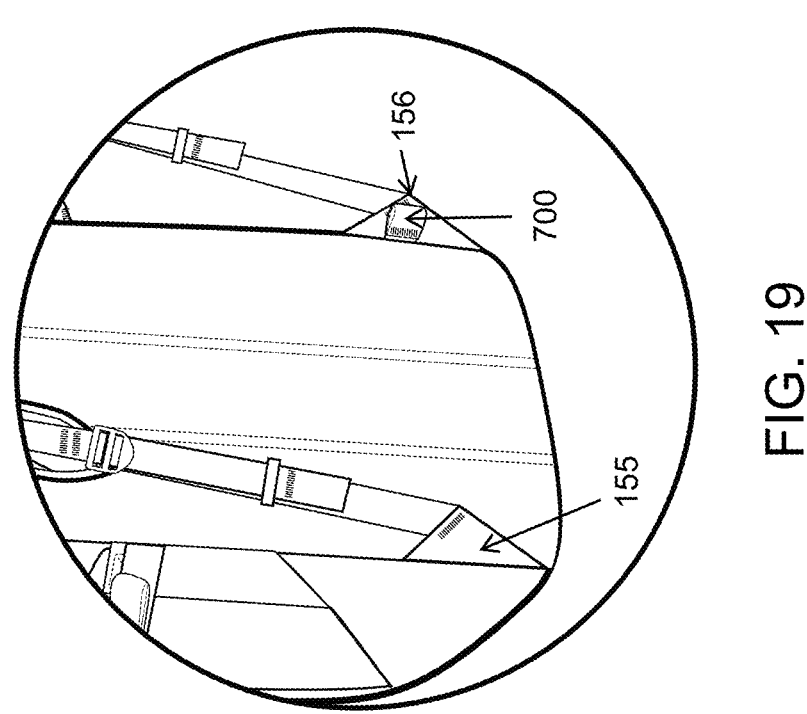
FIG. 19 is a partial front perspective view of FIG. 16 showing the backpack of FIG. 1 with loop attachments.

FIG. 19 is a partial front perspective view of the backpack 100 showing loop attachments 700 connected to protrusions 155 and 156.

Figure 20:
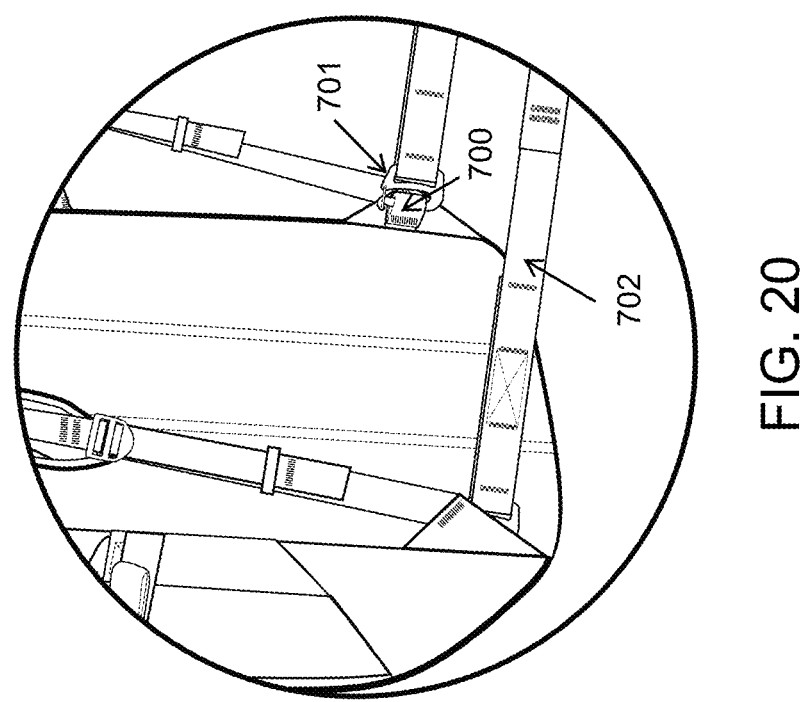
FIG. 20 shows the waist belt of FIG. 18 connected to loop attachments as shown in FIGS. 16 and 19.

FIG. 20 shows straps 702 connected to loops 700 via hooks 701. Retaining device 704 prevents the hooks 701 from accidentally detaching from backpack 100. When a user first connects hooks 701 to loops 700, they must hold open retaining device 704 to insert the hooks 701 into loops 700, and when released the retaining device 704 snaps back into place and encloses loop 700 to prevent detachment.

Figure 21:
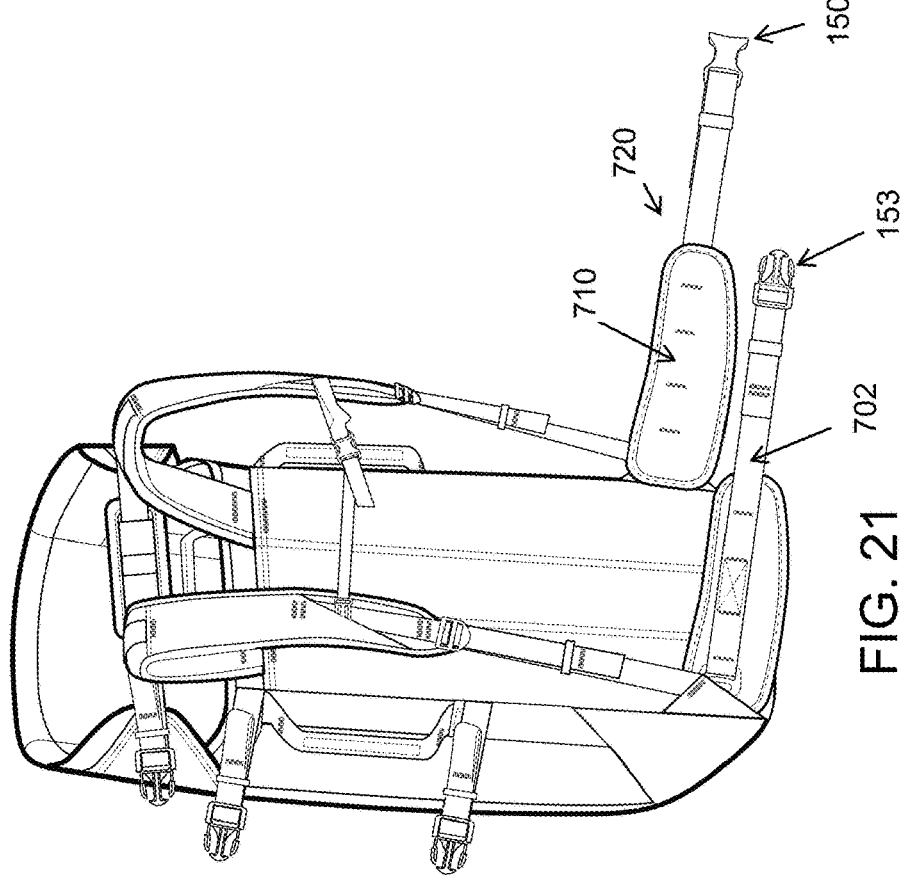
FIG. 21 is front perspective view of the backpack of FIG. 1 with loop attachments, and the hip belt as shown in FIG. 17 connected thereon.

FIG. 21 shows the hip belt 720 connected to the backpack 100 at a first end via loops 700 and hooks 701 on straps 702. Straps 702 at the other end have a male and female buckle 153 and 150 to enable connection to each other around the waist or hip of a user. The length of the straps 702 can be adjusted to shorten or lengthen to an appropriate length for a user. Hip belt 720 provides additional support and stability to a user when used in conjunction shoulder straps 121 and 122. The hip pads 710 also provide more cushioning and comfort to a user.

Figure 22:
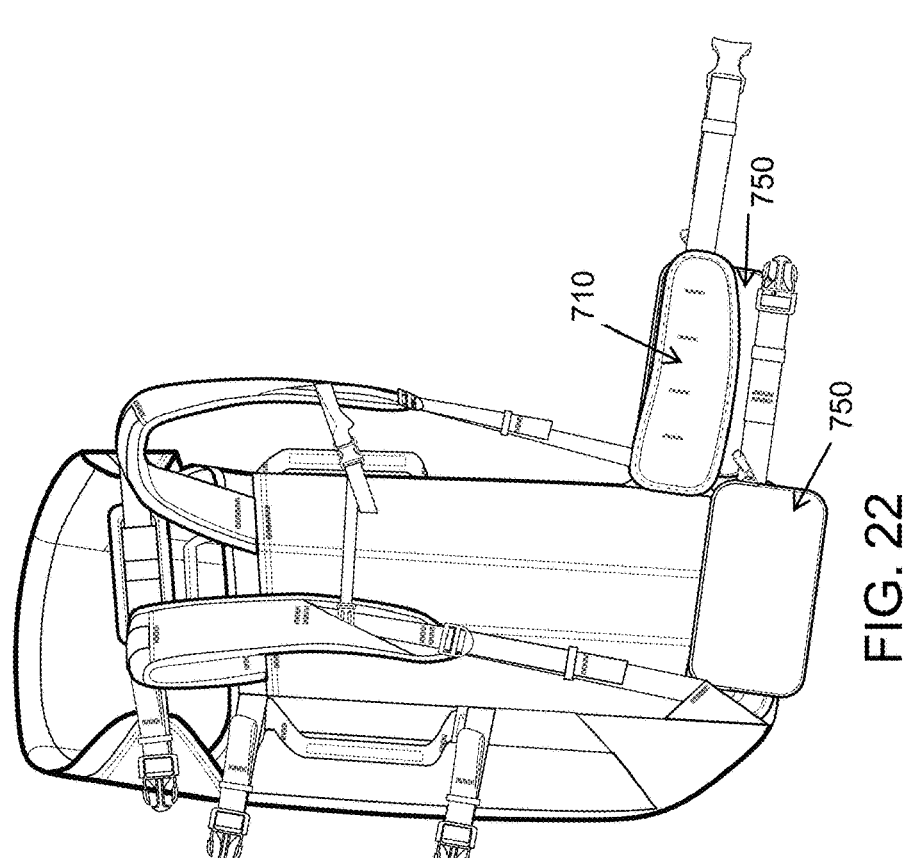
FIG. 22 is front perspective view of the backpack of FIG. 21 with the hip belt and the storage compartment as shown in FIG. 17 connected thereon.

FIG. 22 shows the hip belt 720 connected to backpack 100 as shown in FIG. 21, with storage compartments 750 fully attached thereon as described above. Either one or two compartments 750 can be attached to backpack 100, with one compartment 750 being attachable to each side of the hip belt.

Figures 23, 24:
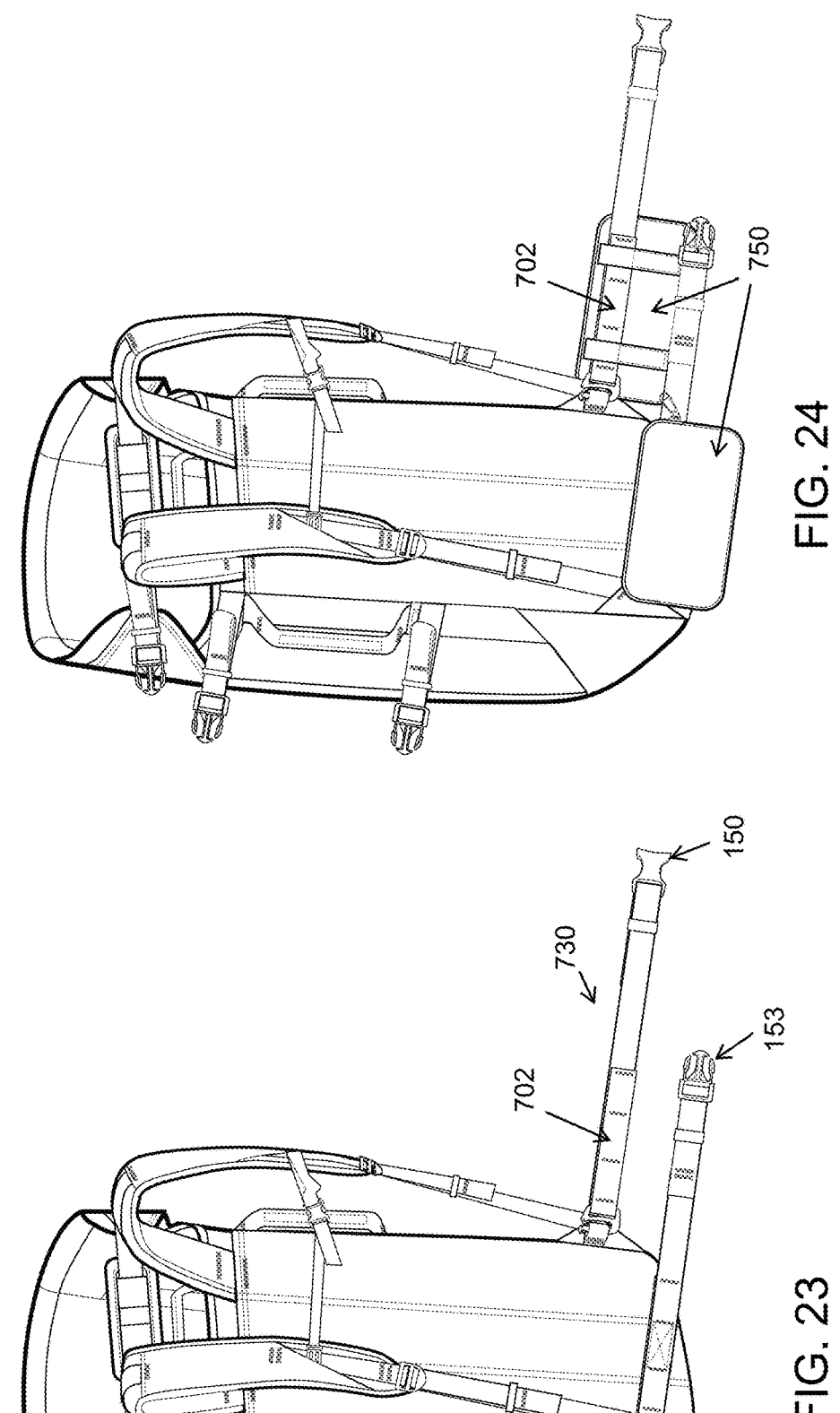
FIG. 23 is front perspective view of the backpack of FIG. 1 with loop attachments, and the waist belt as shown in FIG. 18 connected thereon.
FIG. 24 is front perspective view of the backpack of FIG. 23 with the waist belt and the storage compartment as shown in FIG. 18 connected thereon.

FIG. 23 shows the waist belt 730 connected to the backpack 100 at a first end via loops 700 and hooks 701 on straps 702. Straps 702 at the other end have a male and female buckle 153 and 150 to enable connection to each other around the waist or hip of a user. The length of the straps 702 can be adjusted to shorten or lengthen to an appropriate length for a user. Waist belt 730 provides additional support and stability to a user when used in conjunction shoulder straps 121 and 122. The waist belt is lighter than the hip belt and can be selected by a user desiring to cut down on overall weight, when using the backpack. Similarly, a user desiring more comfort can select the hip belt for the added cushioning.

FIG. 24 shows the waist belt 730 connected to backpack 100 as shown in FIG. 23, with storage compartments 750 attached thereon as described above. Either one or two compartments 750 can be attached to backpack 100, with one being attachable to each side of the waist belt.

Figure 27:
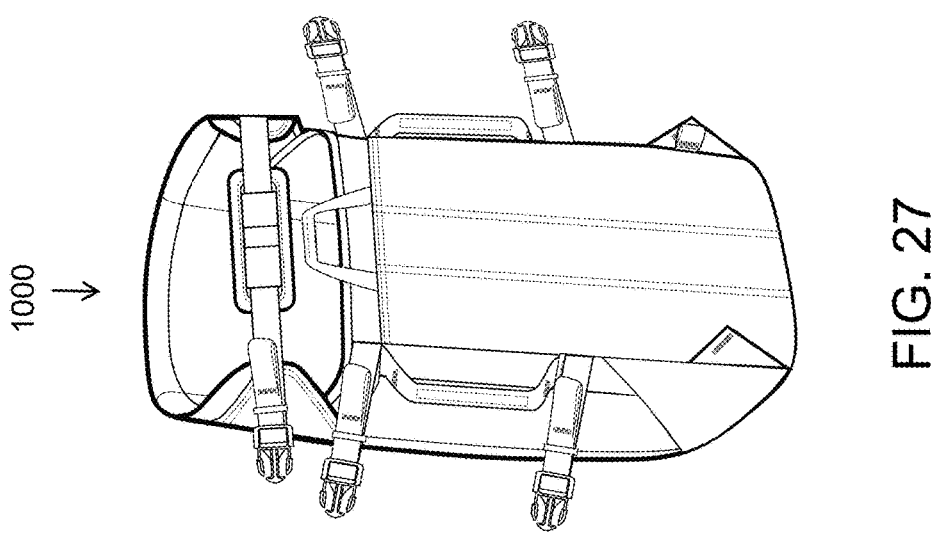
FIG. 27 is a front perspective view of the backpack as shown in FIG. 25 without the shoulder straps.
Figure 26:
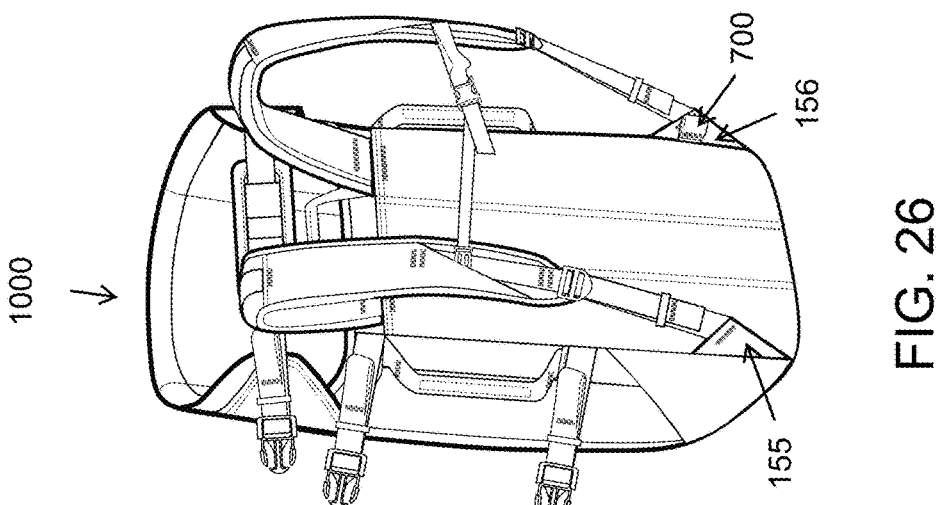
FIG. 26 is a front perspective view of the backpack as shown in FIG. 25.
Figure 25:
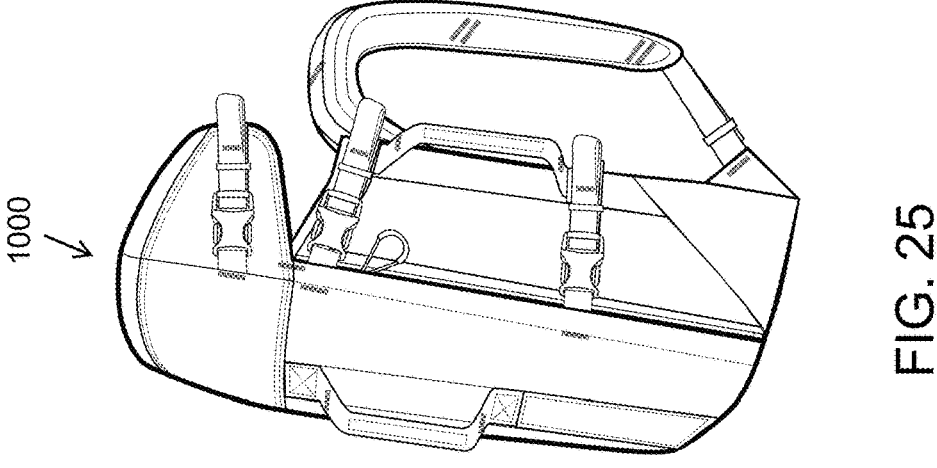
FIG. 25 is a side view illustrating an embodiment of a backpack for carrying animals, that is smaller than the embodiment of the backpack of FIG. 1.

FIGS. 25-27 show an embodiment 1000 of backpack 100. Backpack 1000 is identical to backpack 100 in every way, except that it has been miniaturized, and is smaller than backpack 100. In some embodiments, the panels, 101, 102, 103, 104 and either bottom panel 105 or bottom panels 605, 615, 620 are smaller in dimensions than backpack 100. In some embodiments, only the vertical height of the backpack 1000 is smaller than backpack 100, with other dimensions such as depth and width being the same. Backpack 1000 can be used with any yoke, brace, tail port, and waist or hip belt described herein, and functions identically to backpack 100 as described herein. The backpack 1000 is meant for transporting smaller animals or pets than backpack 100. Additionally, the method for loading and unloading the pet into and out of the pack 1000 are the same as described above for pack 100. Backpack 100 provides more overall volume in the internal compartment or main body portion 50 than backpack 1000.

The packs 100 and 1000 offers increased ergonomics and ease of use. The contoured shaping of the shoulder straps enable an ergonomic fit (based upon 50th percentile anthropometric data). All touch points on packs 100 and 1000 provide a cumulative benefit to improved ergonomics and interface. The packs 100 and 1000 can offer an increased buckle size (in some embodiments a 25 mm side release buckle) for easier use and handling, the thermoplastic polyurethane (TPU) pullers 119 for easier zipper interface and grabbing, the structured handles 131, 132, 133 and 134 (with foam reinforcement) for ergonomic handling, and semi-shaped and contoured shoulder straps 121 and 122 with the sternum strap 144 offer improved fit and comfort for carrying loads, along with a magnetic buckle 150 in some embodiments for improved ergonomic interface. These elements alone or in combination can provide an improved interface and ergonomics for a user. In some embodiments, the male and female buckles 153 and 150 can be color coordinated buckles for visual identification.

Through the materials, fit, and construction; the backpack 100 and 1000 provides a semi-rigid support structure for both the animal and user. In some embodiments, the main fabric uses a phthalate-free Poly-vinyl-chloride (PVC) lamination, TPU lamination or a combination of PVC and TPU lamination on a face or surface of the fabric (can be one or both sides of the fabric, and can be an internal or external side). The main fabric provides a more rigid fabric to maintain shaping throughout each of the panels 101, 102, 103, 104 and 105 (or 605, 615 and 620) alone, all together or in any combination. Placement of a semi-rigid substrate (such as polyurethane (PU) and ethylene-vinyl acetate (EVA)/PU or EVA) in the fabric panels offers additional support, protection and comfort for the animal. Placement in the panels can be between an outside external surface and an inside interior surface, or an upper and lower surface. The main reinforced structures in the backpack are the panel 103 and the panel 101. These "structured" areas can be connected via the side compression straps 142 and 143 to compress the side panels 102 and 104 which are "unstructured" to allow for better compression and fit. Panel 103 being located between the user and the animal, provides not only a cushion for the user, but also provides the same amount of functionality and cushion back to the animal. The combination of these elements on panel 103 allows for the improved fit and comfort of the animal and acts as a semi-rigid structure to encapsulate the animal securely and provide enough structure to comfortably support the spine and neck of the animal. The side compression straps 142 and 143 also aid in the optimized fit of the animal against the user and panel 103. The compression straps allow for additional securement of animal to be more efficient and ergonomic in load bearing and sway prevention (side to side movement), bringing the weight of the animal closer to the user to allow for improved load carrying efficiencies. In some embodiments, the combination of these elements work together to provide a more secure and comfortable fit and carrying experience for the animal and the user. In some embodiments, the shaping and contouring of the fabric panels 101, 102, 103, 104 and 105 (or 605, 615 and 620), or main compartment 50, are optimized around the unique measurements and build of a pet to provide specific comfort and improved fit for the pet, such as a canine.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes can be made and equivalents can be substituted for elements thereof without departing from the scope of the present disclosure. In addition, many modifications can be made to adapt a particular situation or material to the teachings of the disclosure without departing from the scope thereof.

Therefore, it is intended that the present disclosure is not limited to the particular embodiment(s) disclosed. The foregoing examples should not be construed as limiting and/or exhaustive, but rather, as illustrative use cases to show an implementation of at least one of the various embodiments of the present disclosure.

What is claimed is:

1. A backpack for carrying animals comprising:
a main body defining a carrying compartment;
a first shoulder strap and a second shoulder strap connected to a front portion of the main body;
a brace connected to a rear portion of the main body; and
a yoke connected to the brace forming a singular hole between the yoke and an upper lip portion of the main body;
wherein the singular hole defines a paw portal.

2. The backpack according to claim 1, wherein the main body has a tail port.

3. The backpack according to claim 1, wherein the main body has a first zipper and a second zipper disposed on a first side portion and a second side portion, respectively, of the main body, and wherein the first side portion is opposite the second side portion and the front portion is opposite the rear portion.

4. The backpack according to claim 1, wherein the main body has a handle connected to the rear portion of the main body below the brace.

5. The backpack according to claim 1, wherein the main body has a handle connected to a first side portion of the main body below the upper lip portion.

6. The backpack according to claim 1, wherein the main body has a handle connected to a second side portion of the main body below the upper lip portion.

7. The backpack according to claim 1, wherein the main body has a handle connected to the front portion of the main body below the upper lip portion.

8. The backpack according to claim 1, wherein the yoke is slidably connected to the brace by a yoke strap.

9. The backpack according to claim 1, further comprising a waist belt that is connected to first and second protrusions on the main body.

10. The backpack according to claim 1, further comprising a hip belt that is connected to first and second protrusions on the main body.

11. The backpack according to claim 2, wherein the tail port is in a bottom portion of the backpack and is made of a softer material than the bottom portion.

12. The backpack according to claim 3, further comprising a first adjustable compression strap and a second adjustable compression strap attached to the first side portion, and a third adjustable compression strap and a fourth adjustable compression strap attached to the second side portion.

13. The backpack according to claim 3, further comprising an adjustable sternum strap connected to the first shoulder strap on a first end and connected to the second shoulder strap on a second end.

14. The backpack according to claim 3, further comprising a first ventilation panel located on the first side portion and a second ventilation panel located on the second side portion.

15. The backpack according to claim 3, further comprising a first zipper guard covering the first zipper and a second zipper guard covering the second zipper.

16. The backpack according to claim 9, wherein a storage compartment is connected to the waist belt.

17. The backpack according to claim 10, wherein a storage compartment is connected to the hip belt.

18. The backpack according to claim 11, wherein the tail port is horizontally oriented.

19. The backpack according to claim 11, wherein the tail port is vertically oriented.

20. A method of loading an animal into the backpack of claim 3, comprising the steps of:
fully opening the first zipper and the second zipper on the first and second side portions folding back the rear portion to open the backpack to separate the rear portion from the first side portion and second side portion;
placing the animal onto an internal surface of the front portion and into the carrying compartment;
closing the first and second zippers; and
placing limbs of the animal through the paw portal so that the limbs protrude out of the backpack.

21. The backpack according to claim 1, wherein the brace provides support for a neck of an animal.

22. The backpack according to claim 1, wherein the paw portal is configured to accommodate more than one paw of an animal.

* * * * *